United States Patent [19]
Ohyanagi

[11] Patent Number: 5,459,581
[45] Date of Patent: Oct. 17, 1995

[54] IMAGE COMMUNICATION METHOD AND APPARATUS FOR RECORDING AND DISPLAYING VOICE MESSAGE HISTORY INFORMATION

[75] Inventor: Hiroyuki Ohyanagi, Machida, Japan

[73] Assignee: Canon Kabushiki Kaisha, Tokyo, Japan

[21] Appl. No.: 378,739

[22] Filed: Jan. 26, 1995

Related U.S. Application Data

[62] Division of Ser. No. 276,758, Jul. 18, 1994, Pat. No. 5,426,518, which is a continuation of Ser. No. 173,472, Dec. 27, 1993, abandoned, which is a continuation of Ser. No. 831,749, Feb. 10, 1992, abandoned, which is a continuation of Ser. No. 528,848, May 25, 1990, abandoned.

[30] Foreign Application Priority Data

May 29, 1989 [JP] Japan .................................. 1-135522

[51] Int. Cl.⁶ .............................. H04N 1/21; H04N 1/40; H04M 1/64; H04M 11/00
[52] U.S. Cl. ......................... 358/296; 358/440; 358/444; 379/67; 379/100
[58] Field of Search ..................... 358/296, 403, 358/407, 442, 434–436, 438, 439, 440, 444; 379/67, 93, 100; 395/114, 115, 155

[56] References Cited

U.S. PATENT DOCUMENTS

| | | | |
|---|---|---|---|
| 4,432,020 | 2/1984 | Onose et al. | 358/257 |
| 4,800,439 | 1/1989 | Yoshino | 379/100 X |
| 4,815,121 | 3/1989 | Yoshida | 379/67 |
| 4,893,333 | 1/1990 | Baran et al. | 379/100 |
| 4,916,730 | 4/1990 | Hashimoto | 379/70 |
| 4,918,722 | 4/1990 | Duehren et al. | 379/100 |
| 4,920,560 | 4/1990 | Kageyama | 379/100 |
| 4,932,048 | 6/1990 | Kenmochi et al. | 379/67 |
| 4,989,238 | 1/1991 | Iggulden et al. | 379/100 |
| 5,200,836 | 4/1993 | Koizumi | 358/442 X |
| 5,200,993 | 4/1993 | Wheeler et al. | 358/442 X |
| 5,315,697 | 5/1994 | Nagamatsu | 395/155 |
| 5,329,579 | 7/1994 | Brunson | 379/67 X |
| 5,363,204 | 11/1994 | Millman | 358/434 X |

*Primary Examiner*—Peter S. Wong
*Assistant Examiner*—Eric Frahm
*Attorney, Agent, or Firm*—Fitzpatrick, Cella, Harper & Scinto

[57] ABSTRACT

A communication apparatus and method includes a receiver for receiving voice messages, a recorder for recording a plurality of voice messages received by the receiver, a memory for storing history information indicating a history of the voice messages recorded by the recorder and a display for displaying out the history information stored in the memory.

24 Claims, 5 Drawing Sheets

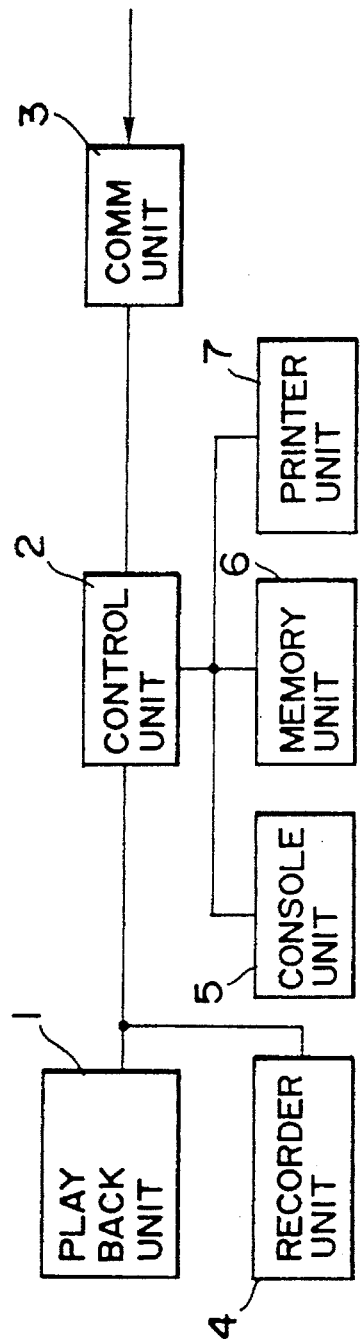
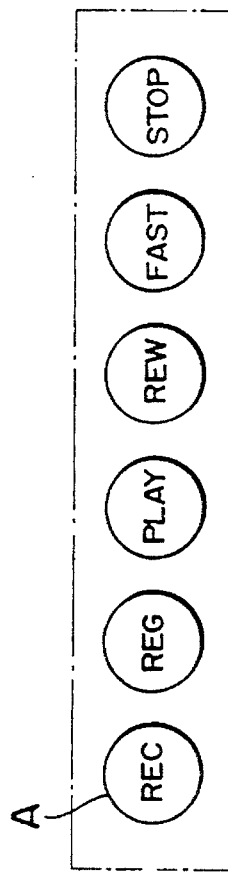

FIG.6

| NUMBER OF CALLS | ABBR. NAME OF CALLING STATION | CALLED TIME | SPEECH TIME |
|---|---|---|---|
| 1 | ○ ○ ○ ○ | 10 : 45 | 0 : 00 |
| 2 | × × × × | 14 : 21 | 0 : 07 |
| 3 | — | 15 : 30 | 0 : 03 |
| 4 | — | 18 : 05 | 0 : 04 |

FIG.7

| DTMF | ABBR. NAME OF CALLING STATION |
|---|---|
| # 00 | × × × × |
| # 01 | ○ ○ ○ ○ |
| # 02 | △ △ △ △ |

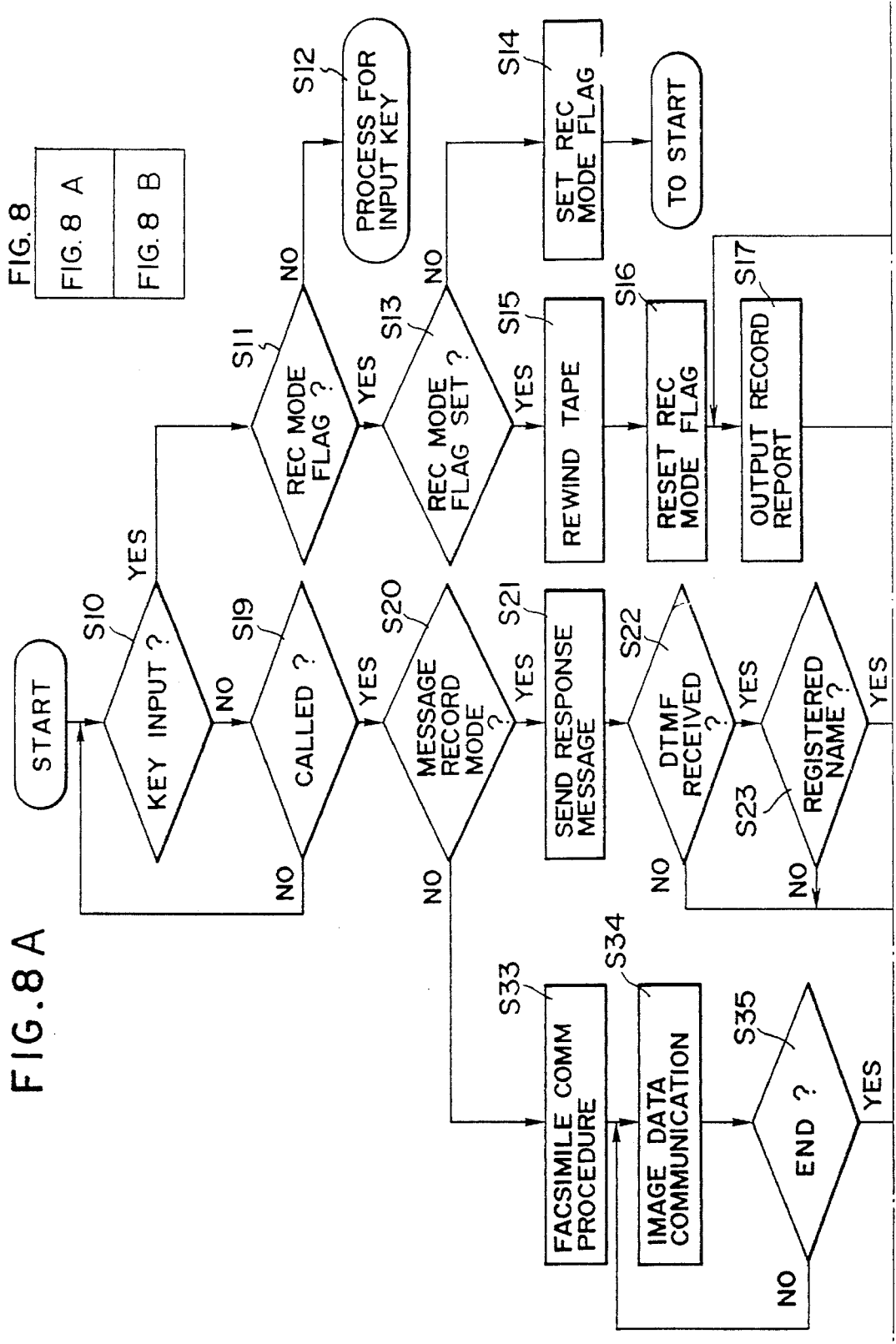

IMAGE COMMUNICATION METHOD AND APPARATUS FOR RECORDING AND DISPLAYING VOICE MESSAGE HISTORY INFORMATION

This application is a division of application Ser. No. 08/276,758 filed Jul. 18, 1994 U.S. Pat. No. 5,426,518, which is a continuation of application Ser. No. 08/173,472, filed Dec. 27, 1993, now abandoned, which is a continuation of application Ser. No. 07/831,749, filed Feb. 10, 1992, now abandoned, which is a continuation of application Ser. No. 07/528,848, filed May 25, 1990, now abandoned.

BACKGROUND OF THE INVENTION

1. Field of the Invention

The present invention relates to an image communication apparatus having a recording/reproducing function of a voice message by means of a cassette tape, a micro-cassette or a recording integrated circuit (IC).

2. Related Background Art

As a prior art apparatus of this type, a facsimile machine which has a function to record a received voice message in a micro-cassette and reproduce the recorded voice message later (auto-recording telephone function) has been known. In this facsimile machine, when the self-record mode is released, the tape is rewound to the beginning, and when the rewinding is completed, the information is sequentially reproduced starting from the first one.

However, in the prior art apparatus, when the number of such auto-recording is large, it takes a long and wasteful time from the release of the auto-record mode to rewind the tape to the beginning. It is also not possible to visually recognize the content of the record.

Other facsimile machines having the auto-recording function are disclosed in U.S. Pat. Nos. 4,800,439, 4,815,121, and 4,932,048 and in pending U.S. application Ser. No. 446,479 filed on Dec. 5, 1989.

SUMMARY OF THE INVENTION

It is an object of the present invention to improve an image communication apparatus to solve the above problems.

It is another object of the present invention to provide an image communication apparatus which permits easy grasp of the content of the entire recorded information.

It is yet another object of the present invention to provide an image communication apparatus which stores control information of recorded voice messages and prints out the control information.

It is yet another object of the present invention to provide an image communication apparatus which stores control information of an entire recorded message and permits easy grasp of the content of the entire recorded message by printing out the control information.

Other objects of the present invention will be apparent from the following detailed description of the embodiments and the drawings.

BRIEF DESCRIPTION OF THE DRAWINGS

FIG. 1 shows a block diagram of a configuration of a facsimile machine in one embodiment.

FIG. 2 shows a plan view of a console panel of the embodiment.

FIGS. 3 and 6 show control tables for auto-recording recorded in a memory in the embodiment.

FIGS. 4 and 8 show flow charts of an operation in an auto-record mode in the embodiment.

FIG. 7 shows a registration table of abbreviations of senders.

FIG. 8 is a schematic block diagram showing the relationship between FIGS. 8A and B.

FIG. 8A is a portion of a flow chart illustrating the method of the present application showing Steps S10 through S17, S19–S23, and Steps S33–S35.

DETAILED DESCRIPTION OF THE PREFERRED EMBODIMENTS

Figure 4:
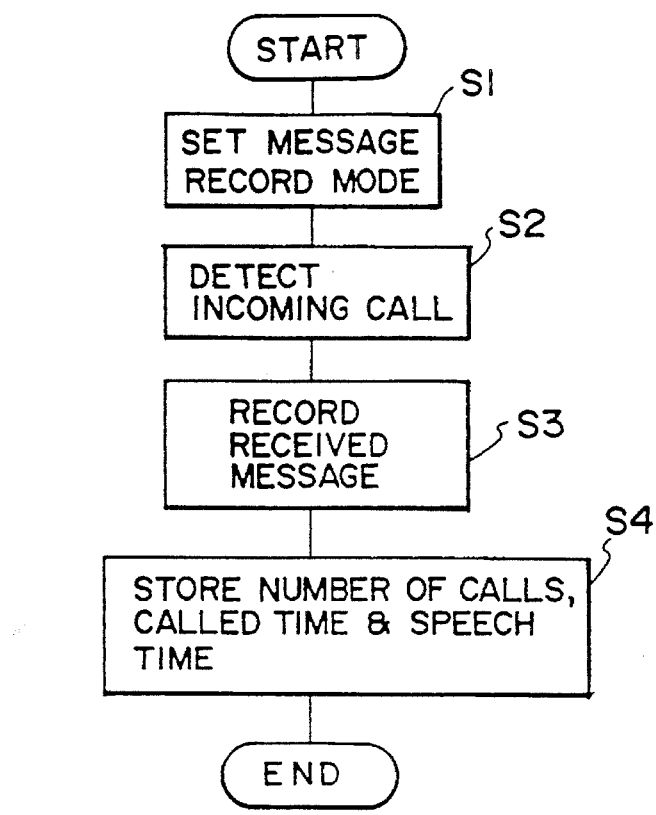

An embodiment of the present invention is now explained in detail with reference to the accompanying drawings.

In the embodiment, a facsimile machine having an auto-recording function is explained as an example of the image communication apparatus. However, the present invention is not only applicable to the facsimile machine, but also to a teletex having an auto-recording function.

FIG. 1 shows a block diagram of the facsimile machine of the present embodiment.

The facsimile machine has a record/playback function for automatically recording a telephone message in addition to a transmit/receive function of image information in a normal mode. It comprises a control unit 2 such as a CPU for controlling the overall apparatus, a communication unit 3 for controlling the transmission/reception of the image information or the voice message, a console unit 5 for entering various inputs, a record unit 4 for recording the voice message, a playback unit 1 for reproducing the voice message, a memory 6 for storing information, and a printer for printing out the image information.

The facsimile machine automatically records the telephone message in a cassette tape. When an auto-record button A shown in FIG. 2 is depressed, the machine is set into the auto-record mode, and when the auto-record button A is depressed again, the auto-record mode is released. The console unit 5 also has manipulation buttons for manipulating the cassette tape recorder.

The memory 6 stores a table which records control information in the auto-record mode, as shown in FIG. 3. The number of calls, the called time and the speech time are sequentially recorded in the table for each auto-recording.

FIG. 4 shows a flow chart of a general operation of the control unit 2 in the auto-record mode in the facsimile machine.

The auto-record button A on the console unit 5 is first depressed to set the auto-record mode in the machine When an incoming call from the communication unit 3 is detected (S2), a received message is recorded by the record unit 4 (S3), and then the number of calls which indicates a total number of calls during the auto-record mode, the time called and the speech time are stored in the table in the memory 6 (S4). The above operation is repeated for each call received.

Figure 5:
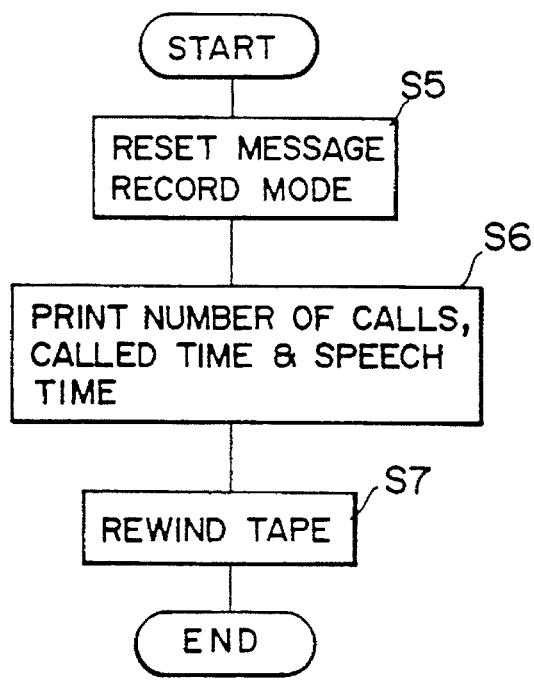
FIG. 5 shows a flow chart of an operation for reproducing the auto-recorded message in the embodiment.

FIG. 5 shows a flow chart of a general operation of the control unit in a playback mode for the recorded message.

When the auto-record button A of the console panel 5 is first depressed to release the auto-record mode (S5), the information recorded in the table of the memory 6 is supplied to the printer 7 which prints it out on a record sheet (S6). Simultaneously, the tape is rewound (S7).

In this manner, the control information is printed out during the wasteful time of tape rewinding, and the entire information for the auto-recording can be visually watched so that recognition of the auto-recorded information is facilitated.

The general control operation of the present embodiment has thus been described. FIG. 8 shows a detailed control flow of the control unit 2. In the flow of FIG. 8, abbreviations of senders are also included in the control information. The abbreviation of senders are previously registered in a table shown in FIG. 7 to correspond to DTMF signals. When a DTMF signal is received from a sender and a registered abbreviation of a sender corresponding to the received DTMF signal is found, the abbreviation of sender information is added to the control information.

Figure 8B:
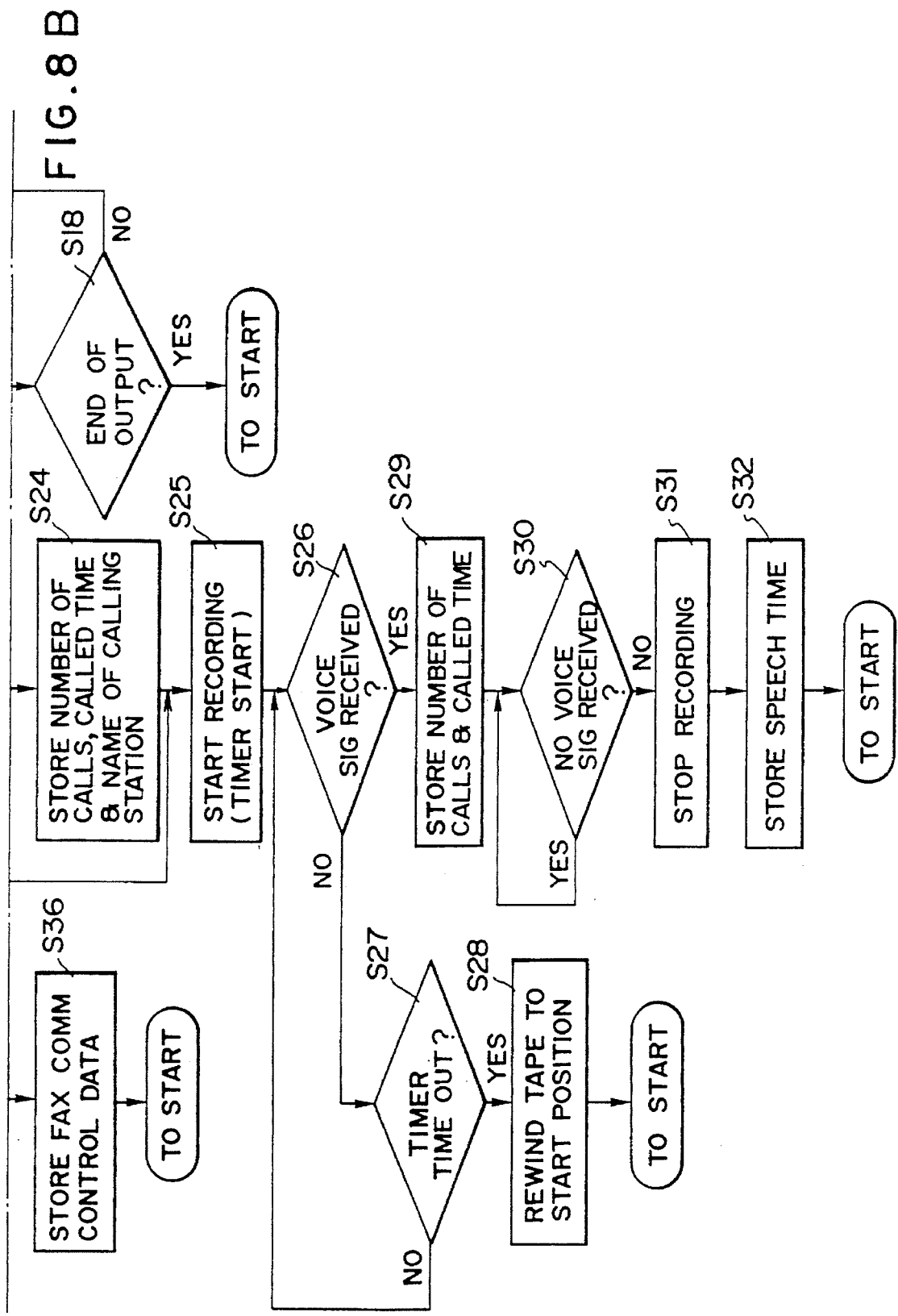
FIG. 8B is the remainder of the flow chart began in FIG. 8A, showing Steps S18, S24–S32, and Step S36.

The flow chart of FIGS. 8A and 8B is now explained.

In steps S10 and S19, the presence or absence of a key entry from the console unit 5 and the presence or absence of a call from the time are checked. If there is a key entry, the process proceeds to a step S11 to determine the entry key and execute a process requested by the entry key. In the step S11, whether the entry key is the auto-record key A or not is determined. The entry key is determined and the corresponding process is executed in a step S12, and then the process returns to the step S10. If the entry key is the auto-record key A, the process proceeds to a step S13 from the step S11 to determine whether an auto-record flag of the memory 6 (which indicates whether the machine is in the auto-record mode or not) is "1" or not. If the auto-record flag is not "1" in the step S13, the auto-record flag is set in a step 14 and the process returns to the step S10. If the auto-record flag is "1" in the step S13, the rewinding of the record tape is started in a step S15, and the auto-record flag is reset in a step S16. In steps S17 and S18, the control information report for the recorded messages in the memory 6 shown in FIG. 6 is recorded, and when the recording of the report is completed, the process returns to the step S10. When the rewinding of the tape is completed, the rewinding is automatically stopped.

When a call from the line is detected in a step S19, the process proceeds to a step S20, to determine whether the auto-record flag is "1" or not (auto-record mode or not). If it is not in the auto-record mode, the process proceeds to steps S33, S34 and S35 from the step S20 to execute the facsimile communication (image communication), and when the facsimile communication is completed, the control information for the facsimile communication is stored in the memory 6 in a step S36, and the process returns to the step S10. The control information for the facsimile communication may be printed out by the printer 7 as the control information for the recorded messages.

On the other hand, if it is in the auto-record mode in the step S20, a voice message for call receive response is sent out at that time in a step S21, and whether the DTMF signal has been received from the communication unit 3 or not is determined in a step S22. If the DTMF signal has been received, whether the abbreviation of a sender corresponding to the received DTMF signal has been registered or not is determined in a step S23, and if the abbreviation of sender has been registered, the number of calls, the abbreviation of the sender and the called time are stored in the control information storage area for the recorded message in the memory 6 shown in FIG. 6. If the DTMF signal has not been received, or if the abbreviation of a sender corresponding to the received DTMF signal has not been registered, the process proceeds to a step S25 from the step S22 or S23. In the step S25, the recording by the record unit 4 is started and a timer T (which may be a 5-second timer) is started. In steps S26 and S27, whether a voice signal has been received from the line or not before the timer T times out is determined. If the voice signal has not been received before the timer T times out, the process proceeds to a step S28 from the step S27 to rewind the tape to the record start position in the step S25. Then the process returns to the step S10.

If the voice signal is received before the timer T times out, the process proceeds to a step S29 from the step S26 to store the number of calls and the called time in the control information storage area for the recorded message in the memory 6. In a step S30, if a decision is that the voice signal has not been received for more than a continuous predetermined period (for example, five seconds), it is determined that the voice message has been ended and the recording is stopped in a step S31. In a step S32, the speech time is recorded in the control information storage area of the recorded message in the memory 6, and the process returns to the step S10.

In this manner, the control information is recorded in the memory 6 each time the voice message is recorded, and when the auto-record mode is subsequently released, the record tape is automatically rewound and the list of control information for the recorded message is recorded.

In accordance with the present embodiment, the operator can easily grasp the summary of the overall recorded voice message.

The present invention is not limited to the above embodiment but various modifications thereof may be made.

What is claimed is:

1. A communication apparatus comprising:

means for receiving voice messages;

means for receiving image data;

means for recording a plurality of voice messages received by said voice message receiving means;

display means for visually displaying the image data received by said image data receiving means;

first generation means for generating history information indicating the history of a received voice message in accordance with the reception of the voice message by said voice message receiving means;

second generation means for generating history information indicating the history of received image data in accordance with the reception of the image data by said image data receiving means;

memory means for storing the history information generated by said first generation means and for storing the history information generated by said second generation means; and means for visually displaying the generated history information generated by said first generation means and the generated history information generated by said second generation means, stored in said memory means, distinguishably from each other.

2. An apparatus according to claim 1, further comprising manual instruction means for releasing a record mode and manually instructing print means to print the history information of the voice messages stored in said memory means.

3. A communication apparatus according to claim 1, wherein said recording means comprises means for recording the voice message on a stored medium.

4. A communication apparatus according to claim 1, wherein the stored medium comprises a magnetic tape.

5. A communication apparatus according to claim 1, further comprising playback means for reproducing the recorded voice messages.

6. A communication apparatus according to claim 1, wherein the history information of the received voice message includes called time and speech time information.

7. A communication apparatus according to claim 1, wherein the history information of the received voice message includes information regarding the sender of the voice message.

8. A communication apparatus, according to claim 1, wherein said apparatus is a facsimile machine.

9. A communication method comprising the steps of:

receiving voice messages;

receiving image data;

recording a plurality of voice messages received in said voice message receiving step;

visually displaying the image data received in said image data receiving step;

generating history information indicating the history of a received voice message in accordance with the reception of the voice message in said voice message receiving step;

generating history information indicating the history of received image data in accordance with the reception of the image data in said image data receiving step;

storing the voice message history information and storing the image data history information; and visually displaying the voice message history information and the image data history information stored in said storing step, distinguishably from each other.

10. A method according to claim 9, further comprising the step of releasing a set record mode in which the voice messages are recorded in accordance with a manual instruction, and manually instructing the history information of the voice messages stored in said storing step to be printed.

11. A communication method according to claim 9, wherein said recording step comprises the step of recording the voice messages on a storage medium.

12. A communication method according to claim 9, wherein the storage medium comprises a magnetic tape.

13. A communication method according to claim 9, further comprising the step of reproducing the recorded voice messages.

14. A communication method according to claim 9, wherein the history information of the received voice message includes called time and speech time information.

15. A communication method according to claim 9, wherein the history information of the received voice message includes information regarding the sender of the voice message.

16. A communication method according to claim 9, wherein said communication method is a facsimile communication method.

17. A communication apparatus which receives voice messages and image data, and visually displays the received image data, said apparatus comprising:

first generation means for generating history information indicating the history of a received voice message;

second generation means for generating history information indicating the history of received image data;

memory means for storing the history information generated by said first generation means and for storing the history information generated by said second generation means; and means for visually displaying the generated history information generated by said first generation means and the generated history information generated by said second generation means, stored in said memory means, distinguishably from each other.

18. A communication method in which voice messages and image data are received, the received voice messages are recorded, and the received image data is visually displayed, said method comprising the steps of:

generating history information indicating the history of a received voice message;

generating history information indicating the history of received image data;

storing the voice message history information and storing the image data history information; and visually displaying the voice message history information and the image data history stored in said storing step, distinguishably from each other.

19. A communication apparatus which receives voice messages and image data, and visually displays the received image data, said apparatus comprising:

means for recording a plurality of received voice messages;

first generation means for generating history information indicating the history of a received voice messages;

second generation means for generating history information indicating the history of received image data;

memory means for storing the history information generated by said first generation means and for storing the history information generated by said second generation means; and means for visually displaying the generated history information generated by said first generation means and the generated history information generated by said second generation means, stored in said memory means, distinguishably from each other.

20. A communication method in which voice messages and image data are received, and the received image data is visually displayed, said method comprising the steps of:

recording a plurality of received voice messages;

generating history information indicating the history of a received voice message;

generating history information indicating the history of received image data;

storing the voice message history information and storing the image data history information; and visually displaying the voice message history information and the image data history information stored in said storing step, distinguishably from each other.

21. A communication apparatus which receives image data, and visually displays the received image data, said apparatus comprising:

means for receiving voice messages;

means for recording a plurality of voice messages received by said voice message receiving means;

first generation means for generating history information indicating the history of a received voice message in accordance with the reception of the voice message by said voice message receiving means;

second generation means for generating history information indicating the history of received image data;

memory means for storing the history information generated by said first generation means and for storing the history information generated by said second generation means; and means for visually printing the generated history information generated by said first generation means and the generated history information generated by said second generation means, stored in said memory means, distinguishably from each other.

22. A communication method in which image data is received and the received image data is visually displayed, said method comprising the steps of:

receiving voice messages;

recording a plurality of received voice messages;

generating history information indicating the history of a received voice message in accordance with the reception of the voice message in said voice message receiving step;

generating history information indicating the history of received image data;

storing the voice message history information and storing the image data history information; and visually displaying the voice message history information and the image data history information stored in said storing step, distinguishably from each other.

23. A communication apparatus which receives voice messages and records a plurality of voice receives messages, said apparatus comprising:

means for receiving image data;

means for visually displaying the received image data;

first generation means for generating history information indicating the history of a received voice message;

second generation means for generating history information indicating the history of received image data in accordance with the reception of the image data by said image data receiving means;

memory means for storing the history information generated by said first generation means and for storing the history information generated by said second generation means; and means for visually displaying the generated history information generated by said first generation means and the generated history information generated by said second generation means, stored in said memory means, distinguishably from each other.

24. A communication method, in which voice messages are received and a plurality of received voice messages are printed, said method comprising the steps of:

receiving image data;

visually displaying the received image data;

generating history information indicating the history of a received voice message;

generating history information indicating the history of received image data in accordance with the reception of the image data by said image data receiving step;

storing the voice message history information and storing the image data history information; and visually displaying the voice message history information and the image data history information stored in said storing step, distinguishably from each other.-.

* * * * *

UNITED STATES PATENT AND TRADEMARK OFFICE
CERTIFICATE OF CORRECTION

PATENT NO. : 5,459,581
DATED : October 17, 1995
INVENTOR(S) : OHYANAGI

It is certified that error appears in the above-indentified patent and that said Letters Patent is hereby corrected as shown below:

COLUMN 2

Line 57, "machine" should read --machine (S1)--.

COLUMN 5

Line 3, "claim 1," should read --claim 3,--.
Line 45, "claim 9," should read --claim 11,--.

COLUMN 6

Line 29, "messages;" should read --message--.

COLUMN 7

Line 29, "voice receives" should read
--received voice--.

Signed and Sealed this

Twelfth Day of March, 1996

Attest:

BRUCE LEHMAN

*Attesting Officer*     Commissioner of Patents and Trademarks